United States Patent
Sunwoo et al.

(10) Patent No.: US 12,043,570 B2
(45) Date of Patent: Jul. 23, 2024

(54) FLEXIBLE COVER WINDOW AND METHOD OF MANUFACTURING SAME

(71) Applicant: UTI INC., Chungcheongnam-do (KR)

(72) Inventors: Kukhyun Sunwoo, Gyeonggi-do (KR);
Tea Joo Ha, Chungcheongnam-do (KR); Jun Su Choi, Gyeongsangbuk-do (KR); Yoon Jin Choi, Chungcheongnam-do (KR)

(73) Assignee: UTI Inc. (KR)

( * ) Notice: Subject to any disclaimer, the term of this patent is extended or adjusted under 35 U.S.C. 154(b) by 121 days.

(21) Appl. No.: 17/509,503

(22) Filed: Oct. 25, 2021

(65) Prior Publication Data
US 2022/0135473 A1 May 5, 2022

(30) Foreign Application Priority Data
Oct. 29, 2020 (KR) .................. 10-2020-0142017

(51) Int. Cl.
*B32B 15/04* (2006.01)
*B32B 17/06* (2006.01)
*C03C 4/18* (2006.01)
*C03C 21/00* (2006.01)

(52) U.S. Cl.
CPC .............. *C03C 21/002* (2013.01); *C03C 4/18* (2013.01); *C03C 2204/00* (2013.01)

(58) Field of Classification Search
CPC .................................................. C03C 21/002
USPC .................................................. 428/410, 426
See application file for complete search history.

(56) References Cited

U.S. PATENT DOCUMENTS

| | | | |
|---|---|---|---|
| 10,131,567 B2* | 11/2018 | Beall | C03C 21/002 |
| 2012/0052271 A1* | 3/2012 | Gomez | C03C 21/002 65/30.14 |
| 2014/0227524 A1* | 8/2014 | Ellison | C03C 3/091 65/30.14 |
| 2015/0030840 A1* | 1/2015 | Gomez | C03C 21/002 428/220 |
| 2017/0022092 A1* | 1/2017 | DeMartino | B32B 17/10 |
| 2017/0197384 A1* | 7/2017 | Finkeldey | B32B 17/10045 |
| 2017/0197870 A1* | 7/2017 | Finkeldey | C03B 27/00 |
| 2019/0337844 A1* | 11/2019 | Ikeda | C03C 3/087 |
| 2019/0337845 A1* | 11/2019 | Heiß-Chouquet | C03C 15/02 |
| 2019/0389764 A1* | 12/2019 | Andrews | C03C 21/002 |
| 2020/0102244 A1* | 4/2020 | Li | C03C 21/002 |

* cited by examiner

*Primary Examiner* — Lauren R Colgan
(74) *Attorney, Agent, or Firm* — Mendelsohn Dunleavy, P.C.

(57) ABSTRACT

Proposed are a flexible cover window for simultaneously improving strength characteristics and folding characteristics of a glass-based ultra-thin flexible cover window, and a method of manufacturing the same. A glass-based flexible cover window is configured such that a ratio of the intensity of replacing metal ions at the glass center to the intensity of replacing metal ions at the glass surface is 1:3 or greater. The present disclosure can provide a flexible cover window with improved window strength characteristics and folding characteristics by adjusting the depth (ion penetration depth) and the surface compressive stress of a tempered layer by performing a gradient tempering process including primary tempering, slimming, and secondary tempering.

12 Claims, 2 Drawing Sheets

FLEXIBLE COVER WINDOW AND METHOD OF MANUFACTURING SAME

CROSS REFERENCE TO RELATED APPLICATION

The present application claims priority to Korean Patent Application No. 10-2020-0142017, filed Oct. 29, 2020, the entire contents of which is incorporated herein for all purposes by this reference.

BACKGROUND OF THE INVENTION

Field of the Invention

The present disclosure relates to a flexible cover window for simultaneously improving strength characteristics and folding characteristics of a glass-based ultra-thin flexible cover window, and to a method of manufacturing the same.

Description of the Related Art

With the rapid advancement of electric and electronic technologies, display products having various functions are being developed. To meet such needs of the times, the shape of the display products has become more diversified and there is an increasing trend toward lightweight and thin display products.

A display product typically has a cover window applied to the top of a display panel to protect the display panel, and thinning of the cover window is also required to meet the trend of reducing the weight and thickness of the display product.

Conventionally, a material such as a polymer film has been used as a cover window. However, the polymer film has weak mechanical strength and thus merely serves to prevent scratches on the display panel. Other disadvantages include weak impact resistance, low transmittance, and relatively high cost.

In order to overcome this limitation of the polymer film for the cover window, various studies on a glass-based cover window have recently been conducted.

The glass-based cover window has been up to now widely used due to advantageous features such as no screen distortion, sufficient durability against external shocks, and excellent touch feeling. In addition, the glass-based cover window is basically required to have physical properties such as sufficient strength not to be deformed or damaged even by repeated contact with a touch pen or an impact such as a pen drop.

However, as the glass-based cover window becomes thinner, the required physical properties, particularly durability and impact resistance, are not fulfilled.

In addition, as various flexible display products are released, there is a strong demand for a glass-based flexible cover window. In the case of the glass-based flexible cover window, it is necessary to simultaneously satisfy physical properties required for the folding characteristics as well as the strength characteristics.

In compliance with the trend toward weight reduction and thinning of display products, the demand for ultra-thin glass of 800 µm or less is increasing in the field of the glass-based flexible cover window. This calls for the development an optimal tempering process that simultaneously achieves the strength characteristics and folding characteristics.

The foregoing is intended merely to aid in the understanding of the background of the present disclosure, and is not intended to mean that the present disclosure falls within the purview of the related art that is already known to those skilled in the art.

SUMMARY OF THE INVENTION

Accordingly, the present disclosure has been made keeping in mind the above problems occurring in the related art, and an objective of the present disclosure is to provide a flexible cover window for simultaneously improving strength characteristics and folding characteristics of a glass-based ultra-thin flexible cover window, and a method of manufacturing the same.

In order to achieve the above objective, according to one aspect of the present disclosure, there is provided a glass-based flexible cover window configured such that a ratio of an intensity of replacing metal ions at a glass center to an intensity of replacing metal ions at a glass surface is 1:3 or greater.

According to another aspect of the present disclosure, there is provided a method of manufacturing a flexible cover window, the method including: a first step of providing glass; a second step of subjecting the glass to primary tempering to form a tempered layer on a surface of the glass; a third step of subjecting the surface of the glass to slimming to reduce a depth of the tempered layer; and a fourth step of subjecting the glass to secondary tempering to increase a compressive stress of the glass. Here, a series of the second to fourth steps may be repeatedly performed once or a plurality of times to enable gradient tempering of the glass while increasing the compressive stress thereof.

Furthermore, a tempering time of the secondary tempering of the fourth step may be set to be shorter than that of the primary tempering of the second step, or a tempering time of a subsequent tempering process may be set to be shorter than that of a previous tempering process.

Furthermore, the primary tempering of the second step and the secondary tempering of the fourth step may be implemented by any one or a combination of at least two of an ion exchange process, an ion implantation process, and an ion assist process.

Furthermore, the primary tempering of the second step and the secondary tempering of the fourth step may be implemented by applying any one of chemical dipping, chemical slurry, spray tempering, and paste tempering to each of the primary tempering and the secondary tempering, or by applying a combination of at least two of chemical dipping, chemical slurry, spray tempering, and paste tempering to each of the primary tempering and the secondary tempering.

Furthermore, after performing the primary tempering of the second step or after performing the secondary tempering of the fourth step, heat treatment or rapid cooling may be performed.

Furthermore, the ion exchange process may be performed by immersing the glass in a mixed metal salt or a single metal salt. Here, the mixed metal salt may include at least one of $LiNO_3$, $NaNO_3$, $KNO_3$, $RbNO_3$, $CsNO_3$, $Li_2SO_4$, $Na_2SO_4$, $K_2SO_4$, $Rb_2SO_4$, and $Cs_2SO_4$, and the single metal salt may be any one of $LiNO_3$, $NaNO_3$, $KNO_3$, $RbNO_3$, $CsNO_3$, $Li_2SO_4$, $Na_2SO_4$, $K_2SO_4$, $Rb_2SO_4$, and $Cs_2SO_4$.

Here, the replacing metal ions may include K ions.

Furthermore, the slimming of the third step may be implemented by any one or a combination of at least two of wet etching, polishing, laser forming, and masking, or wet etching, laser forming, or masking which use polishing as a post process.

Here, the flexible cover window may be configured such that the compressive stress achieved by the gradient tempering may be relatively high even under the same tensile stress condition.

The present disclosure can provide a flexible cover window with improved window strength characteristics and folding characteristics by adjusting the depth (ion penetration depth) and the surface compressive stress of the tempered layer by performing a gradient tempering process including primary tempering, slimming, and secondary tempering.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE INVENTION

The present disclosure relates to a method of manufacturing a flexible cover window for simultaneously improving strength characteristics and folding characteristics of a glass-based ultra-thin flexible cover window, and to a flexible cover window manufactured thereby.

In particular, the present disclosure relates to a method of manufacturing a flexible cover window, the method ensuring optimal strength characteristics and folding characteristics by adjusting the depth (ion penetration depth) and the surface compressive stress of a tempered layer by tempering glass in multiple stages and slimming the tempered layer between the tempering processes, and to a flexible cover window manufactured thereby.

Figure 1:
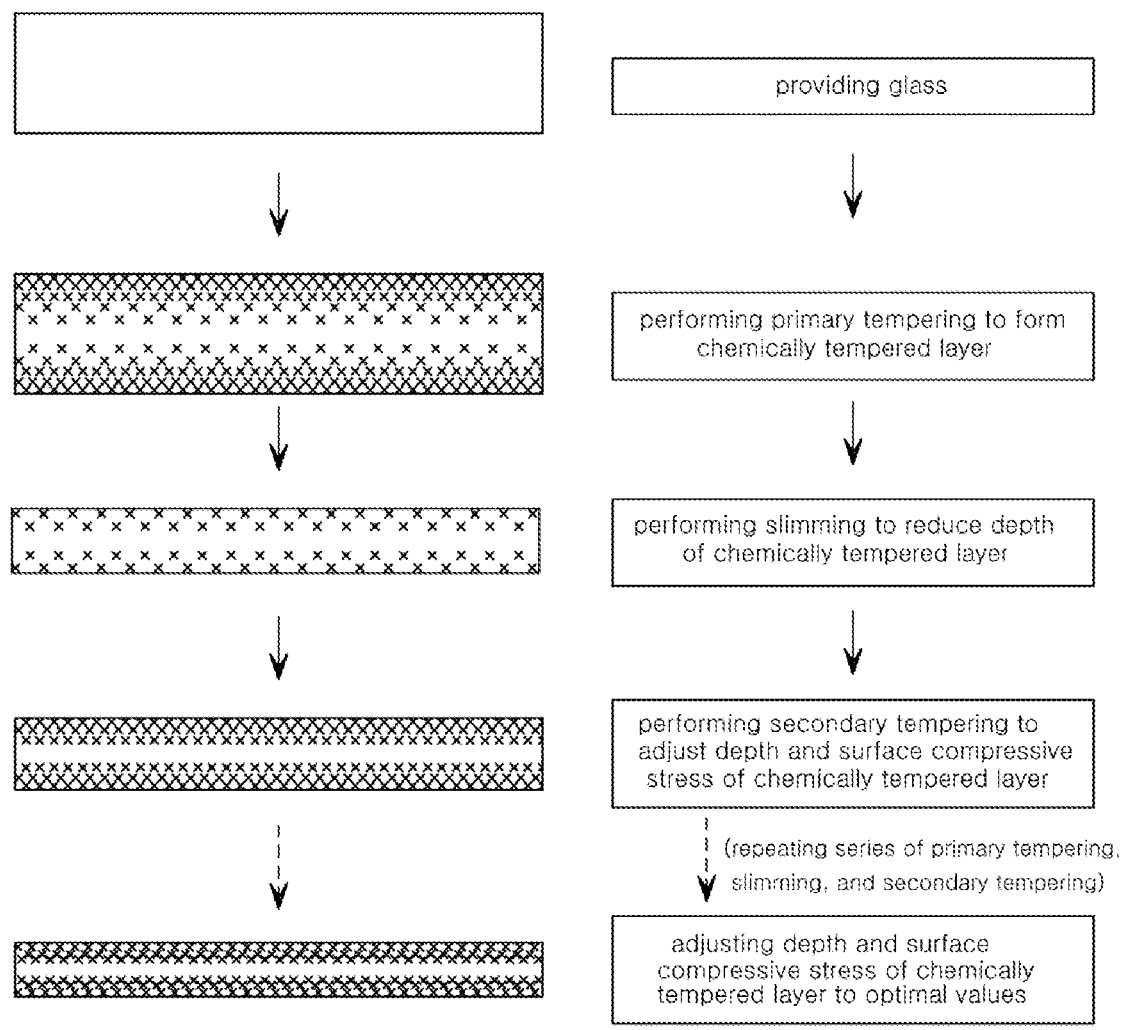
FIG. 1 is a schematic diagram illustrating a method of manufacturing a flexible cover window according to an embodiment of the present disclosure.
Figure 2:
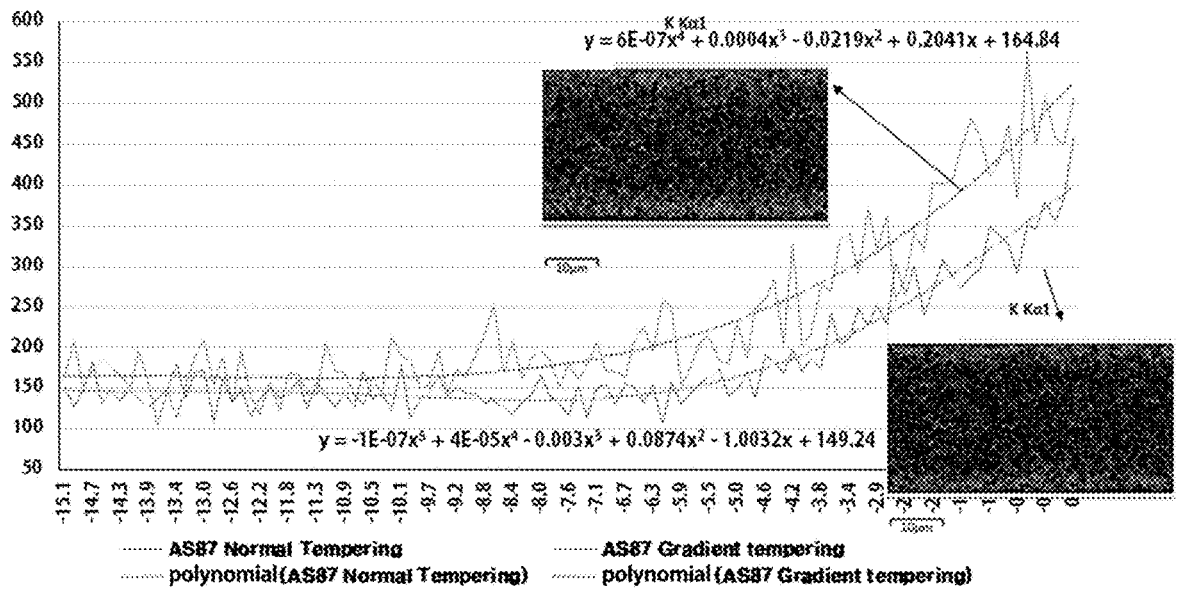
FIG. 2 is a graph illustrating K ion intensity as a function of depth of glass according to Example of the present disclosure and Comparative Example 1.
Figure 3:
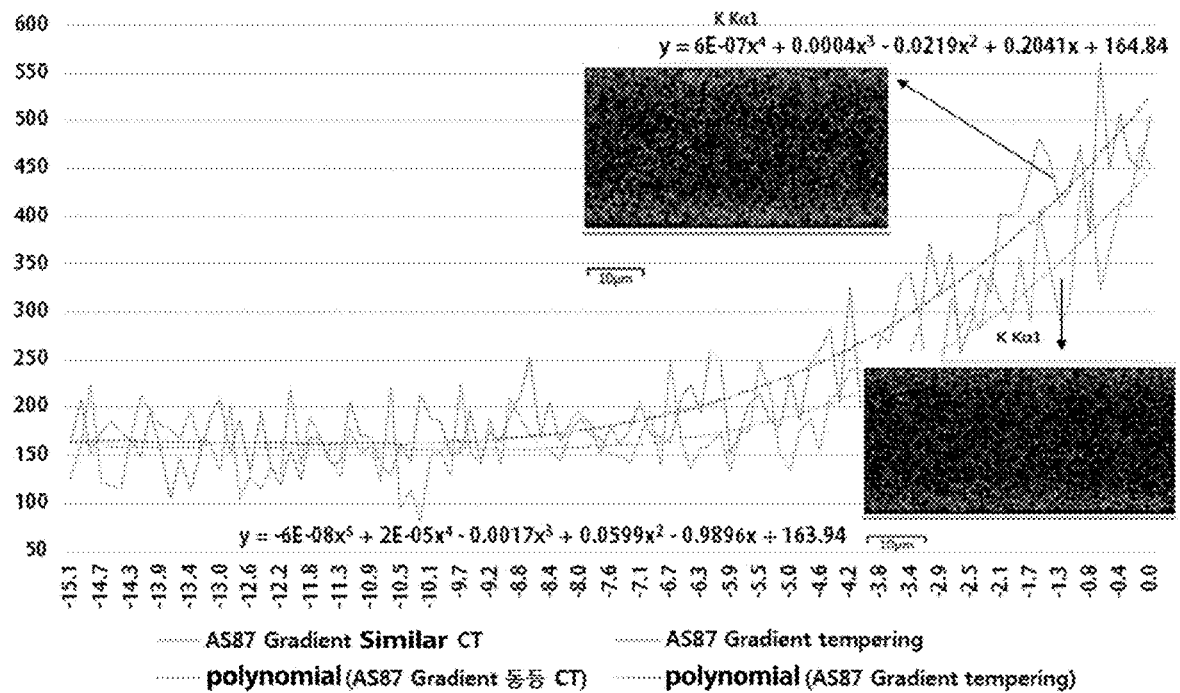
FIG. 3 is a graph illustrating K ion intensity as a function of depth of glass according to Example of the present disclosure and Comparative Example 2.

Hereinafter, the present disclosure will be described in detail with reference to the accompanying drawings. FIG. 1 is a schematic diagram illustrating a method of manufacturing a flexible cover window according to an embodiment of the present disclosure, FIG. 2 is a graph illustrating K ion intensity as a function of depth of glass according to Example of the present disclosure and Comparative Example 1, and FIG. 3 is a graph illustrating K ion intensity as a function of depth of glass according to Example of the present disclosure and Comparative Example 2.

As illustrated in FIG. 1, the method of manufacturing flexible cover window according to the present disclosure includes a first step of providing glass, a second step of subjecting the glass to primary tempering to form a tempered layer on a surface of the glass; a third step of subjecting the surface of the glass to slimming to reduce the depth of the tempered layer; and a fourth step of subjecting the glass to secondary tempering to increase the compressive stress on the surface of the glass. Here, a series of the second to fourth steps is repeatedly performed once or a plurality of times to enable gradient tempering of the glass while increasing the compressive stress on the surface of the glass.

The glass according to the present disclosure may be any one that can be tempered physically or chemically, but may be, for example, aluminum silicate-based or soda-lime-based glass (first step).

In addition, the glass according to the present disclosure is not limited in thickness, but may have a thickness of about 20 to 800 µm, which is sufficient to improve the strength characteristics of thin glass.

First, the glass according to the present disclosure is subjected to primary tempering to form the tempered layer on the surface of the glass (second step). Here, the tempered layer means a region in which the chemical composition of the glass surface is changed through tempering. In one embodiment of the present disclosure, the tempered layer is determined by the penetration depth of replacing ions as a result of chemical tempering, which is usually called a depth of layer (DOL).

The tempering according to the present disclosure may be any one or a combination of an ion exchange process, an ion implantation process, and an ion assist process. In one embodiment of the present disclosure, the tempering may be any one or a combination of chemical dipping, chemical slurry, spray tempering, and paste tempering.

In a preferred embodiment of the present disclosure, the tempering may be chemical dipping for ion exchange. That is, the tempering is a process in which the glass is immersed (dipped) in a metal salt for ion exchange to form the tempered layer on the surface of the glass. Hereinafter, the embodiment of the present disclosure will be described with a focus on the ion exchange as a result of chemical dipping.

The primary tempering is performed on 30 µm-thick glass provided according to the embodiment of the present disclosure to form the tempered layer on the surface of the glass.

Here, the primary tempering is performed by adjusting the tempering conditions depending on the strength characteristics and folding characteristics of a product to which the present disclosure is to be finally applied. This is implemented by adjusting the tempering time and temperature.

The glass that has been subjected to the primary tempering in this manner has the tempered layer having a specific depth and thus exhibits a specific tensile stress.

In general, chemical tempering based on ion exchange involves the immersion of the glass in a metal salt containing larger metal ions than metal ions in the glass at a specific time and temperature where the larger metal ions than the metal ions in the glass penetrate into the glass, creating a compressive stress (CS) on the surface of the glass.

In this case, when the depth of the tempered layer, i.e., the penetration depth (DOL) of the metal ions is increased, the compressive stress (CS) is decreased to maintain the stress balance, making it difficult to secure the tempered layer having specific strength characteristics and the desired compressive stress.

That is, when the depth of the tempered layer is increased, the compressive stress is decreased, and when the depth of the tempered layer is decreased, the compressive stress is increased. For this reason, in the case of this glass, there is a limit to improving the strength characteristics. In addition, although it is necessary to increase the compressive stress in order to improve the folding characteristics, the depth of the tempered layer needs to be reduced, resulting in a deterioration in the strength characteristics.

To address such a problem, the present disclosure provides a tempering method capable of complementarily adjusting the depth and compressive stress of the tempered layer to improve optimal strength characteristics and folding characteristics of thin glass so as to be optimally used for a flexible cover window.

As described above, as a result of performing the primary tempering on the glass according to the embodiment of the present disclosure, the tempered layer having a specific depth is formed with a specific tensile stress. In this case, the depth of the tempered layer may be adjusted depending on the tempering time and temperature, and the primary tempering is performed below the deformation temperature of the glass for a sufficient time (5 minutes to 2 hours) in consideration of durability.

While it is possible to form the tempered layer with a sufficient depth by the primary tempering, the tensile stress is reduced and thus there is a limit to improving the strength characteristics and folding characteristics.

To overcome this limitation, in the present disclosure, a process is performed to reduce the depth of the tempered layer by subjecting the surface of the glass to slimming (third step).

The slimming may be any process that reduces the depth of the tempered layer. In one embodiment of the present disclosure, the slimming may be implemented by any one or a combination of at least two of wet etching, polishing, laser forming, and masking, or wet etching, laser forming, or masking which use polishing as a post process.

Then, the secondary tempering is performed on the slimmed glass to increase the compressive stress of the glass (fourth step).

Here, the secondary tempering is performed under conditions of a specific tempering temperature and time in consideration of the strength characteristics and folding characteristics of the final product according to the thickness of the glass.

Unlike the primary tempering, the secondary tempering is a process that is focused on increasing the compressive stress on the glass surface. The tempering time of the secondary tempering of the fourth step may be set to be shorter than that of the primary tempering of the second step. This is to increase only the surface compressive stress without changing the depth of the slimmed tempered layer.

In addition, if necessary, the primary tempering of the second step and the secondary tempering of the fourth step may be performed at different temperatures. For example, depending on the composition of the glass, the temperature of the secondary tempering may be set to be lower than that of the primary tempering so that only the surface compressive stress is increased without the change in the depth of the slimmed tempered layer.

To this end, the secondary tempering of the fourth step is performed under conditions in which the tempering temperature thereof is set to be lower than that of the primary tempering of the second step and the tempering time thereof is set to be shorter than that thereof.

As described above, by performing the primary tempering, slimming, and secondary tempering under specific conditions in consideration of the strength and folding characteristics of the product, it is possible to independently adjust the depth and surface compressive stress of the tempered layer.

On the other hand, in another embodiment of the present disclosure, a series of the primary tempering, slimming, and secondary tempering may be repeated a plurality of times if necessary depending on the specifications of the product, and the tempering processes may be performed in multiple stages by adjusting the depth and surface compressive stress of the tempered layer in a graded manner. This will be referred to as gradient tempering in the present disclosure.

When the series of the primary tempering, slimming, and secondary tempering is repeated a plurality of times, the depth and surface compressive stress of the tempered layer may be adjusted to a specific depth and a specific compressive stress by setting the tempering time of the subsequent tempering process to be shorter than that of the previous tempering process or by setting the tempering temperature of the subsequent tempering process to be lower than that of the previous tempering process.

On the other hand, after performing the primary tempering of the second step or after performing the secondary tempering of the fourth step, heat treatment or rapid cooling may be performed to adjust the depth and compressive stress of the tempered layer.

According to the embodiment of the present disclosure, each of the primary tempering and the secondary tempering may be performed by chemical tempering based on ion exchange as described above, and may be performed by chemical dipping in which glass is dipped in a mixed metal salt or a single metal salt.

Here, the mixed metal salt may include at least one of $LiNO_3$, $NaNO_3$, $KNO_3$, $RbNO_3$, $CsNO_3$, $Li_2SO_4$, $Na_2SO_4$, $K_2SO_4$, $Rb_2SO_4$, and $Cs_2SO_4$, and the single metal salt may be any one of $LiNO_3$, $NaNO_3$, $KNO_3$, $RbNO_3$, $CsNO_3$, $Li_2SO_4$, $Na_2SO_4$, $K_2SO_4$, $Rb_2SO_4$, and $Cs_2SO_4$. These metal salt materials may be may be suitably selected and used depending on the composition of the glass, i.e., the metal ions contained in the glass, and depending on the depth of the tempered layer to be formed.

In order to form the tempered layer according to the present disclosure, the metal ions contained in the glass are replaced by at least one kind of ions having a radius greater than that of Na ions among the metal ions contained in the glass. In one embodiment of the present disclosure, the metal ions in the glass are replaced by K ions.

To this end, as the single metal salt, KNO3 may be used. As the mixed metal salt, NaNO3 and KNO3 may be mixed and used in an appropriate ratio depending on the depth of the tempered layer.

The flexible cover window according to the present disclosure thus manufactured is configured such that a ratio of the intensity of replacing metal ions at the glass center to the intensity of replacing metal ions at the glass surface is 1:3 or greater. Preferably, the intensity of replacing metal ions is the intensity of K ions.

The intensity of replacing metal ions is a measure of the number of metal ions, i.e., the intensity of metal ions, as a function of the depth of the glass and is measured through energy dispersive X-ray (EDX) analysis. In the flexible cover window according to the present disclosure, the intensity of replacing metal ions at the glass surface is three times or more the intensity of replacing metal ions at the glass center. The intensity of replacing metal ions at the glass surface does not increase and becomes saturated after a certain period of time depending on the type of the glass, the type of the metal salt, and the tempering conditions. Therefore, the intensity of replacing metal ions at the glass surface is three times or more the intensity of replacing metal ions at the glass center, and the upper limit of the intensity of replacing metal ions at the glass surface is set to a value at which the intensity of replacing metal ions on the surface becomes saturated.

Compared to a conventional case where the ratio of the intensity of replacing metal ions at the glass center to the intensity of replacing metal ions at the glass surface of 1:1.5 to 2.8, a very high K ion intensity at the glass surface is achieved through gradient tempering according to the present disclosure. This means that the compressive stress at the glass surface is increased thereby.

In addition, in the case of the flexible cover window according to the present disclosure, as illustrated in FIGS. 2 and 3, when the horizontal axis represents the depth of the glass, the vertical axis represents the intensity of replacing K ions, and these values are approximated by quadratic curves obtained by the least square method, $y=6E-07x^4+0.0004x^3-0.0219x^2+0.2041x+164.84$.

FIG. 2 illustrates measurement results of energy dispersive X-ray (EDX) analysis, in which the horizontal axis represents the depth of the glass (the distance from the surface to the center), the vertical axis represents the intensity of replacing K ions, and these values are approximated by quadratic curves obtained by the least square method. The intensities of replacing K ions as a function of the glass depth in the case of a flexible cover window according to Example of the present disclosure subjected to a gradient tempering process (red curve) and in the case of a flexible cover window according to Comparative Example 1 subjected to only a normal single-stage tempering process (blue curve) are approximated by quadratic curves obtained by the least square method.

As illustrated in FIG. 2, the results revealed that the K ion intensity at the glass surface achieved by the gradient tempering process according to the present disclosure was much higher than that achieved by the normal single-stage tempering process, indicating that the surface compressive stress was high.

FIG. 3 illustrates measurement results of energy dispersive X-ray (EDX) analysis, illustrating the intensities of replacing K ions as a function of the glass depth in the case of the flexible cover window subjected to the single-stage tempering so as to have the same tensile stress as that at the glass center (green pattern) achieved by the gradient tempering process and in the case of the flexible cover window subjected to the gradient tempering process (blue pattern).

In FIG. 3, the horizontal axis represents the depth of the glass (the distance from the surface to the center), the vertical axis represents the intensity of replacing K ions, and these values are approximated by quadratic curves obtained by the least square method. The intensities of replacing K ions as a function of the glass depth in the case of the flexible cover window according to Example of the present disclosure subjected to the gradient tempering process (red curve) and in the case of a flexible cover window according to Comparative Example 2 subjected to only the normal single-stage tempering process (blue curve) are approximated by quadratic curves obtained by the least square method.

As illustrated in FIG. 3, the results revealed that in the case of the flexible cover window according to Example of the present disclosure, the K ion intensity at the glass surface was high even under the same tensile stress condition, indicating that a relatively high compressive stress could be achieved by the gradient tempering process.

Table 1 below illustrates the results of measuring the physical properties of the flexible cover window according to the embodiment of the present disclosure.

TABLE 1

| Parameter | Test Item | Example(30 μm) | Comparative Example 1(30 μm) |
|---|---|---|---|
| Folding Characteristics | 2PB | Average 0.39 R | Average 0.6 R |
| | Folding Yield | 100% | 80% |
| Strength Characteristics | Puncture Test(2 mm Tip Dia.) | Average 20 Kgf | 5 Kgf |
| | Pen Drop(6.2 g pen/0.5 mm Dia. Tip, Acrylic Panel w/o OCA) | Average 10~20 cm | Average 1.5 cm |

As illustrated in Table 1 above, the results revealed that in the case of a 2PB test for measuring the folding characteristics, Comparative Example 1 (single-stage tempering) had an average of 0.6 R, whereas Example of the present disclosure had an average of 0.39 R, indicating that the bending characteristics were improved.

In the case of a folding yield test for measuring the folding characteristics, Comparative Example 1 had a folding yield of 80%, whereas Example of the present disclosure had a folding yield of 100%, indicating that the folding characteristics were improved.

In the case of a puncture test for measuring the strength characteristics, Comparative Example 1 had an average puncture resistance of 5 Kgf, whereas Example according to the present disclosure had an average puncture resistance of 20 Kgf, indicating that the strength characteristics were improved.

In the case of a pen drop test for measuring the strength characteristics, Comparative Example 1 had an average pen drop height of 1.5 cm, whereas Example according to the present disclosure had an average pen drop height of 10 to 20 cm, indicating that the strength characteristics were significantly improved.

As described above, compared to the 30 μm-thick flexible cover window subjected to the normal single-stage tempering process, the flexible cover window according to the present disclosure subjected to the gradient tempering process including the primary tempering, slimming, and secondary tempering can simultaneously improve both the strength characteristics and the folding characteristics by appropriately adjusting the optimal values of the depth and compressive stress of the tempered layer (ion penetration depth, DOL) and thus can be very suitably applicable to a thin glass-based flexible cover window.

What is claimed is:

1. A glass flexible cover window wherein a ratio of an intensity of replaced metal ions at a glass center to an intensity of replaced metal ions at a glass surface is 1:3 or greater,
   a thickness of the glass is 30 microns, and
   said glass flexible cover window comprises a tempered layer, wherein a depth and compressive stress of the tempered layer are adjusted by gradient tempering of the glass by performing a series of processes including primary tempering of the glass, partial slimming of the tempered layer resulting from the primary tempering, and secondary tempering of the glass resulting from the partial slimming, or by repeatedly performing the series of processes, wherein a tempering time of the secondary tempering is set to be shorter than that of the primary tempering, or a tempering time of a subsequent tempering process is set to be shorter than that of a previous tempering process, wherein the compressive stress achieved by the gradient tempering is higher than the compressive stress achieved by only primary tempering under the same tensile stress condition, and the folding yield of the glass is about 100%, and the 2PB test value of the glass is an average of about 0.39R, an average of 20 Kgf in a puncture test of the glass with a 2 mm tip diameter; and an average of about 10 to about 20 cm in a pen drop test of the glass with a 6.2 g. pen with a tip having a diameter of 0.5 mm using an acrylic panel without optically clear adhesive.

2. A method of manufacturing the glass flexible cover window as claimed in claim 1, the method comprising:
a first step of providing glass;
a second step of subjecting the glass to primary tempering to form a tempered layer on a surface of the glass;
a third step of subjecting the surface of the glass to slimming to reduce a depth of the tempered layer; and
a fourth step of subjecting the glass to secondary tempering to increase a compressive stress of the glass,
wherein a series of the second to fourth steps is repeatedly performed once or a plurality of times to achieve gradient tempering of the glass while increasing the compressive stress thereof.

3. The method of claim 2, wherein a tempering time of the secondary tempering of the fourth step is set to be shorter than that of the primary tempering of the second step, or
a tempering time of a subsequent tempering process is set to be shorter than that of a previous tempering process.

4. The method of claim 2, wherein the primary tempering of the second step and the secondary tempering of the fourth step are implemented by any one or a combination of at least two of an ion exchange process, an ion implantation process, and an ion assist process.

5. The method of claim 4, wherein the primary tempering of the second step and the secondary tempering of the fourth step are implemented by applying any one of chemical dipping, chemical slurry, spray tempering, and paste tempering to each of the primary tempering and the secondary tempering, or by applying a combination of at least two of chemical dipping, chemical slurry, spray tempering, and paste tempering to each of the primary tempering and the secondary tempering.

6. The method of claim 4, wherein after performing the primary tempering of the second step or after performing the secondary tempering of the fourth step, heat treatment or rapid cooling is performed.

7. The method of claim 4, wherein the ion exchange process is performed by immersing the glass in a mixed metal salt or a single metal salt.

8. The method of claim 7, wherein the mixed metal salt comprises at least one of $LiNO_3$, $NaNO_3$, $KNO_3$, $RbNO_3$, $CsNO_3$, $Li_2SO_4$, $Na_2SO_4$, $K_2SO_4$, $Rb_2SO_4$, and $Cs_2SO_4$, and the single metal salt is any one of $LiNO_3$, $NaNO_3$, $KNO_3$, $RbNO_3$, $CsNO_3$, $Li_2SO_4$, $Na_2SO_4$, $K_2SO_4$, $Rb_2SO_4$, and $Cs_2SO_4$.

9. The method of claim 4, wherein the flexible cover window is configured such that a ratio of an intensity of replacing metal ions at a glass center to an intensity of replacing metal ions at a glass surface is 1:3 or greater.

10. The method of claim 9, wherein the replacing metal ions comprise K ions.

11. The method of claim 2, wherein the slimming of the third step is implemented by any one or a combination of at least two of wet etching, polishing, laser forming, and masking, or wet etching, laser forming, or masking which use polishing as a post process.

12. The method of claim 2, wherein the flexible cover window is configured such that the compressive stress achieved by the gradient tempering is relatively high even under the same tensile stress condition.

* * * * *